US012611622B2

(12) United States Patent
Abdalla et al.

(10) Patent No.: US 12,611,622 B2
(45) Date of Patent: Apr. 28, 2026

(54) MULTISTAGE FILTER WITH HYDROPHOBIC SCREEN

(71) Applicant: CUMMINS FILTRATION INC., Nashville, TN (US)

(72) Inventors: Wassem Abdalla, Fishers, IN (US); Mark T. Wieczorek, Cookeville, TN (US); Joshua Ryan Hendrixson, Smithville, TN (US)

(73) Assignee: Atmus Filtration Inc., Nashville, TN (US)

( * ) Notice: Subject to any disclaimer, the term of this patent is extended or adjusted under 35 U.S.C. 154(b) by 308 days.

(21) Appl. No.: 18/267,863

(22) PCT Filed: Dec. 16, 2021

(86) PCT No.: PCT/US2021/063807
§ 371 (c)(1),
(2) Date: Jun. 16, 2023

(87) PCT Pub. No.: WO2022/133087
PCT Pub. Date: Jun. 23, 2022

(65) Prior Publication Data
US 2024/0066446 A1 Feb. 29, 2024

Related U.S. Application Data

(60) Provisional application No. 63/127,447, filed on Dec. 18, 2020.

(51) Int. Cl.
*B01D 17/04* (2006.01)
*B01D 29/11* (2006.01)
(Continued)

(52) U.S. Cl.
CPC ......... *B01D 36/003* (2013.01); *B01D 17/045* (2013.01); *B01D 29/114* (2013.01);
(Continued)

(58) Field of Classification Search
CPC .... B01D 36/003; B01D 17/045; B01D 29/58; B01D 35/005; B01D 2201/295;
(Continued)

(56) References Cited

U.S. PATENT DOCUMENTS 6,019,229 A 2/2000 Rao
6,716,349 B2 4/2004 Baracchi et al.
(Continued)

FOREIGN PATENT DOCUMENTS

CN 105190015 A 12/2015
EP 2 451 551 B1 5/2012
(Continued)

OTHER PUBLICATIONS

Extended European Search Report issued for European Patent Application No. 21907816.9 issued Sep. 25, 2024.
(Continued)

*Primary Examiner* — Benjamin L Lebron
(74) *Attorney, Agent, or Firm* — Benesch Friedlander Coplan & Aronoff LLP

(57) ABSTRACT

A filter element includes a first filter media defining a central channel. An endcap is disposed on an end of the filter media, the endcap defining an outlet for clean fluid to exit the filter media. A second filter media is disposed radially inward of the first filter media, the second filter media structured to coalesce water. A hydrophobic screen is disposed across the outlet defined in the endcap.

22 Claims, 11 Drawing Sheets

(51) Int. Cl.

| | |
|---|---|
| *B01D 29/58* | (2006.01) |
| *B01D 35/00* | (2006.01) |
| *B01D 36/00* | (2006.01) |
| *F02M 37/34* | (2019.01) |
| *F16J 15/06* | (2006.01) |

(52) U.S. Cl.
CPC ........... *B01D 29/58* (2013.01); *B01D 35/005* (2013.01); *F02M 37/34* (2019.01); *F16J 15/06* (2013.01); *B01D 2201/295* (2013.01); *B01D 2201/302* (2013.01); *B01D 2201/304* (2013.01)

(58) Field of Classification Search
CPC ........ B01D 2201/302; B01D 2201/304; F02M 37/34; F02M 37/24; F16J 15/06
See application file for complete search history.

(56) References Cited

U.S. PATENT DOCUMENTS

| | | | |
|---|---|---|---|
| 10,737,208 | B2 | 8/2020 | Schwartz et al. |
| 2009/0145826 | A1 | 6/2009 | Calcaterra et al. |
| 2010/0219117 | A1 | 9/2010 | Reiland et al. |
| 2014/0251889 | A1 | 9/2014 | Laforge |
| 2017/0050134 | A1 | 2/2017 | Veit et al. |
| 2020/0406169 | A1 | 12/2020 | Betcher et al. |

FOREIGN PATENT DOCUMENTS

| | | | | |
|---|---|---|---|---|
| EP | 3164205 | B1 | 4/2020 | |
| WO | WO-2017034813 | A1 * | 3/2017 ....... F02M 35/02458 |
| WO | WO-2019/112561 | A1 | 6/2019 | |
| WO | WO-2019/173736 | A1 | 9/2019 | |
| WO | WO-2020/142237 | A1 | 7/2022 | |

OTHER PUBLICATIONS

International Search Report and Written Opinion issued for PCT Application No. PCT/US2021/063807 issued May 19, 2022, 43 pages.
Office Action issued in European Patent Application No. 21907816.9, dated Feb. 2, 2026.

* cited by examiner

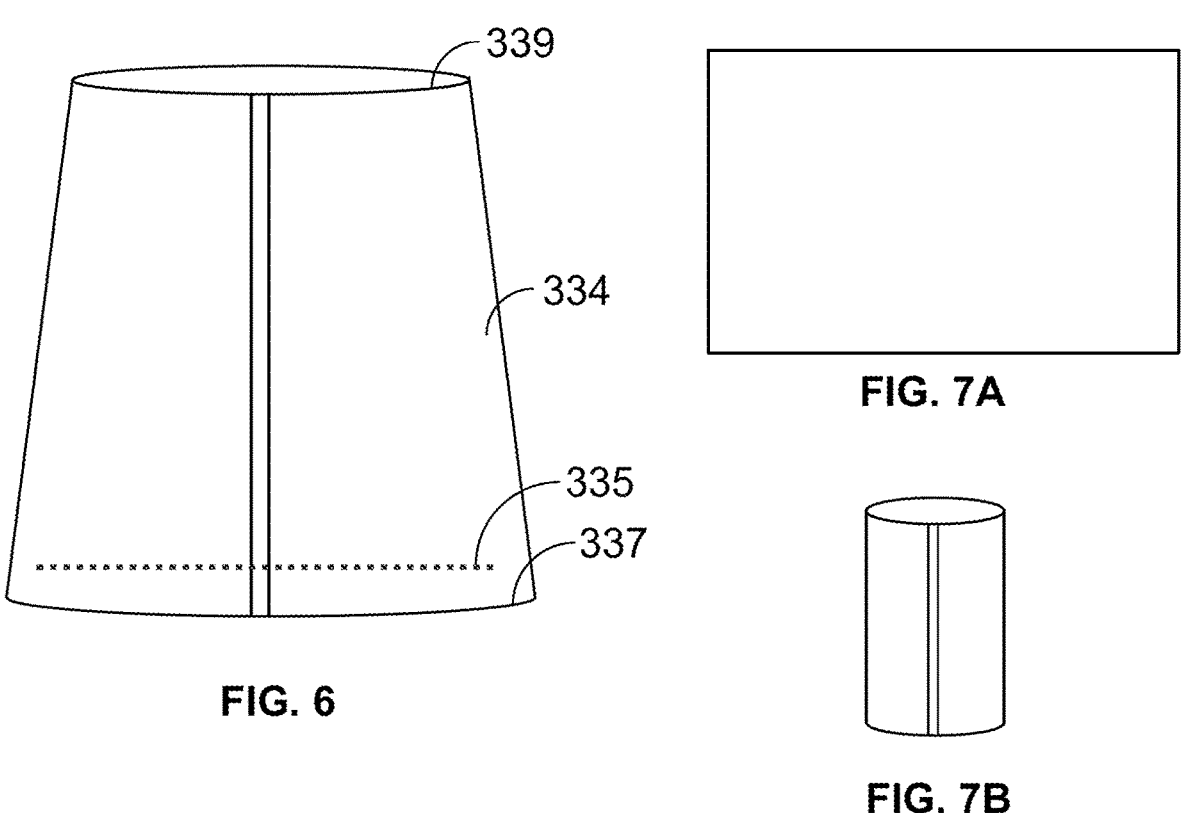
339
334
335
337
FIG. 6
FIG. 7A
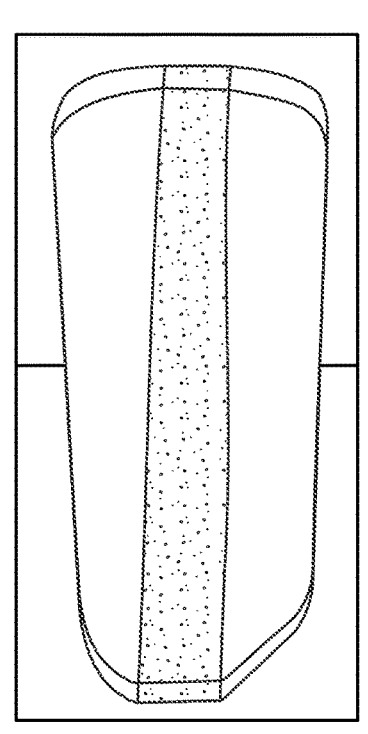
FIG. 7B
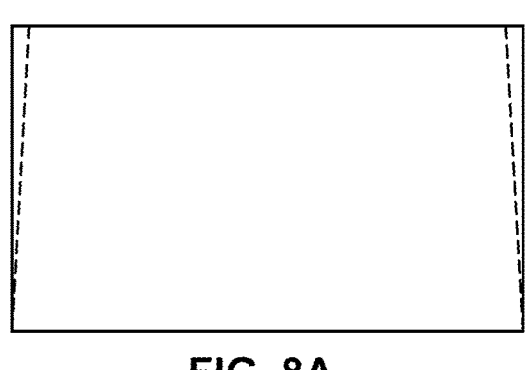
FIG. 8A
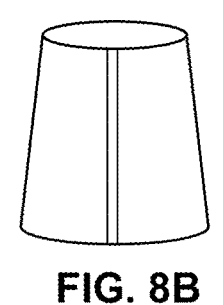
FIG. 8B
FIG. 8C

FIG. 10A   FIG. 10B   FIG. 10C

Step 1

600

Side View

Top Layer

Bottom Layer/Layers

Sonic Welds

Step 2

Top View

A   B   C   D   E

A

B   Gap (Y)

C

D

MULTISTAGE FILTER WITH HYDROPHOBIC SCREEN

CROSS-REFERENCE TO RELATED APPLICATIONS

The present application is a National Phase based on PCT Application No. PCT/US2021/063807, filed Dec. 16, 2021, which claims priority to and benefit of U.S. Provisional Application No. 63/127,447, filed Dec. 18, 2020. The contents of these applications are incorporated herein by reference.

TECHNICAL FIELD

The present disclosure relates generally to filtration systems for filtering fluids such as fuel.

BACKGROUND

Internal combustion engines generally combust a mixture of fuel (e.g., diesel, gasoline, natural gas, etc.) and air. Prior to entering the engine, the fuel is typically passed through a filter element to remove particulate matter (e.g., dust, metal particles, debris, etc.), and in some instances, also separate water from the fuel. Such fuel-water separator filter assemblies generally separate water at an outer diameter of the filter element, and the separated water accumulates in a water reservoir located below the filter element. In some instances water may still be present in the clean fuel after passing through various water separation layers which is undesirable.

SUMMARY

Embodiments described herein relate generally to fuel-water separator filter assemblies and in particular to filter assemblies that include a multilayer filter media, as well as a hydrophobic screen disposed across an outlet defined in an endcap of the filter media, and/or filter elements having a tapered filter media tube.

In some embodiments, a filter element includes a first filter media defining a central channel. An endcap is disposed on an end of the filter media, the endcap defining an outlet for clean fluid to exit the filter media. A second filter media is disposed radially inward of the first filter media, the second filter media structured to coalesce water. A hydrophobic screen is disposed across the outlet defined in the endcap.

In some embodiments, a sealing member for forming a seal between a filter element and a filter head is provided. The sealing member comprises a sealing member main body configured to be disposed within a central channel of a filter media of the filter element, the sealing member main body defining an upstream end of the sealing member. A sealing member downstream portion is located downstream of the sealing member main body, the sealing member downstream portion having a larger cross-sectional width than the upstream end. A sealing member intermediate portion couples the sealing member main body to the sealing member downstream portion. The sealing member also comprises an endcap sealing portion comprising a circumferential wall extending axially towards the upstream end of the sealing member from the sealing member intermediate portion such that a radial space is formed between the sealing member main body and the endcap sealing portion.

In some embodiments, a filter element comprises a first filter media defining a central channel. A filter media tube is disposed within the central channel, the filter media tube having a tapered profile along a longitudinal axis of the filter element, and an endcap is disposed on an end of the first filter media, the endcap defining an outlet for clean fluid to exit the filter element.

In some embodiments, a method of forming a filter element comprises layering a top filter media layer over at least one bottom media layer. Vertical points along a length of the top filter media layer and the bottom filter media layers are coupled to form a filter media, and the filter media is rolled into a filter media tube so as to cause pillowing on of an inner surface or an outer surface of the filter media tube.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter in this disclosure are contemplated as being part of the inventive subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 6 is a side view of a filter media tube that is tapered, according to an embodiment.

FIG. 7A illustrates a rectangular filter media sheet, and FIG. 7B shows the rectangular filter media sheet being folded into a uniform cross-section filter media tube, according to an embodiment.

FIG. 8A illustrates a rectangular filter media sheet, and FIG. 8B shows the rectangular filter media sheet being folded into a tapered filter media tube, according to an embodiment.

FIG. 8C is a side perspective view of the filter media tube of FIG. 8B.

FIGS. 10A-10B are perspective views of a tapered filter media tube being prevented from complete insertion into a center tube by the assembly tool of FIG. 9; FIG. 10C is a perspective view of the tapered filter media tube inserted into the center tube in the correct orientation with not interference from the assembly tool of FIG. 9.

Figure 1:
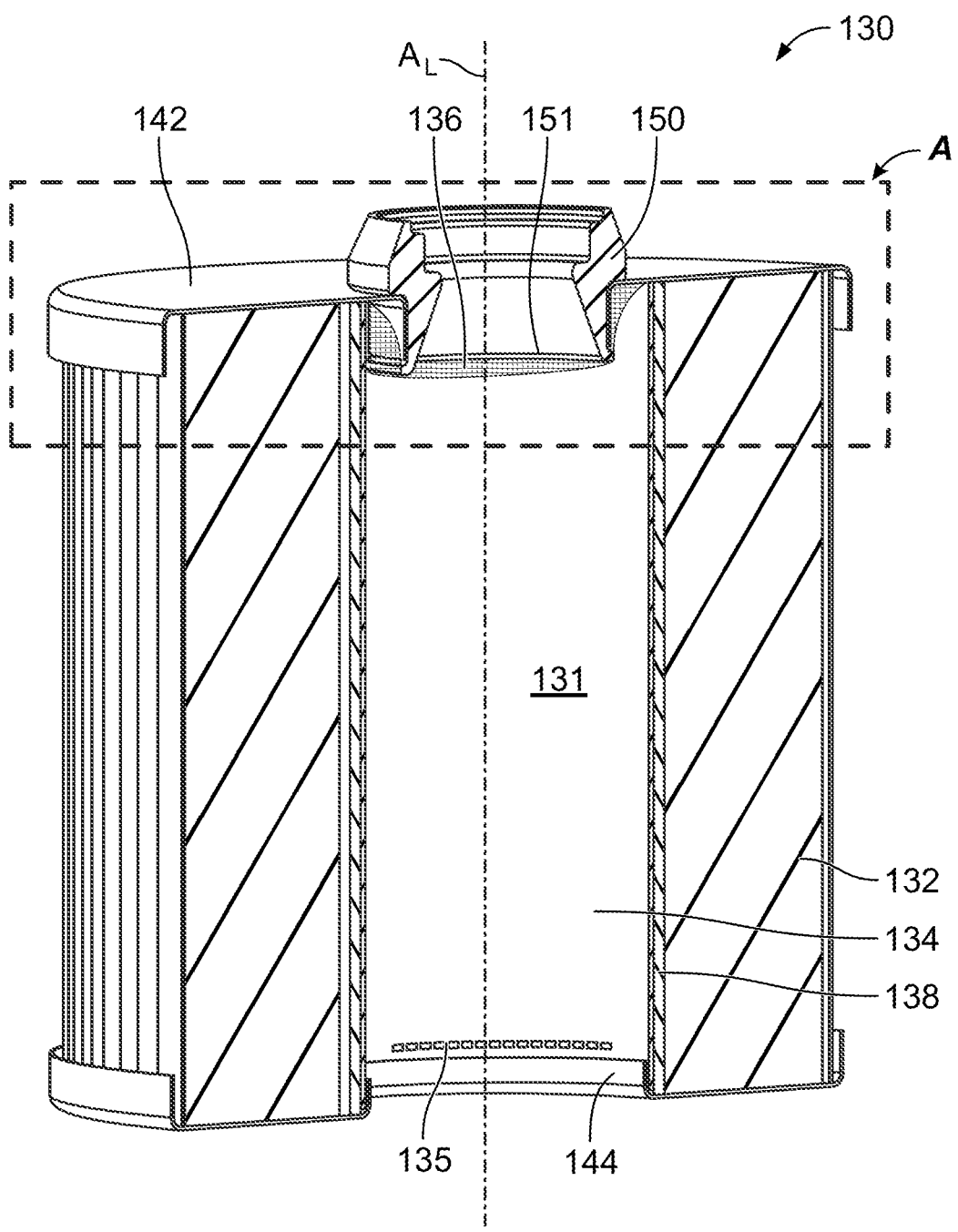
FIG. 1 is a cross-sectional view of a filter element, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to fuel-water separator filter assemblies and in particular to filter assemblies that include a multilayer filter media, and a hydrophobic screen disposed across an outlet defined in an endcap of the filter media, and/or filter elements having a tapered filter media tube.

Embodiments of the filter elements described herein may provide various benefits including, for example: (1) providing improved water separation efficiency (of up to 99%) in various embodiments; (2) allowing easy integration with existing filter elements; and (3) increasing water separation efficiency without any significant increase in manufacturing complexity or fabrication cost.

It should be appreciated that while various embodiment of the filter elements and filter assemblies described herein are described as fuel-water separators structured to separate water from fuel, it should be understood that the concepts described herein can be used for filtering, and separating water from any fluid, for example, lubricant, air, air-fuel mixture, etc.

FIG. 1 is a side cross-section view of a filter element 130, according to an embodiment. The filter element 130 includes a first filter media 132 defining a central channel 131 about a longitudinal axis $A_L$ of the filter element 130. A center tube 138 is disposed within the central channel 131. The first filter media 132 is a radial flow filter element configured to filter the fuel as the fuel flows in a radial direction from an outer radial surface of the first filter media 132 and through the first filter media 132 into the central channel 131 as filtered fuel, for example, via a plurality of openings defined in the center tube 138. In some embodiments, the first filter media 132 may include a pleated filter media. In other embodiments, the first filter media 132 may include a straw media, a fluted media, a tetrahedral media, a corrugated media, depth filter media, or any other suitable filter media. In some embodiments, the first filter media 132 may be configured to coalesce and separate water from the fuel as the fuel passes through the first filter media 132.

A second filter media 134 is disposed radially inward of the center tube 138. The second filter media 134 may be configured to coalesce water droplets. In some embodiments, the second filter media 134 may be a bi-layer filter media including a first layer structured to coalesce water, and a second layer radially disposed downstream of the first layer and configured to strip the water. The water stripping layer could be also made as separate layer inward from the second filter media 134. The second layer may be a hydrophobic layer structured to further separate or strip water that may still remain in the fuel after passing through the first layer. In some embodiments, the second filter media 134 may include a filter media tube, for example, a coalescing tube disposed within the central channel 131 radially inwards of the center tube 138, or in other embodiments, between the first filter media 132 and the center tube 138. The coalescing tube may form the first layer of the second filter media 134 and further coalesces water droplets so as to make the water droplets larger and heavier. A hydrophobic layer or any other water separation layer is coupled to an upstream layer of the second filter media 134, for example, coupled to an inner surface of the first layer, and form the second layer of the second filter media 134. The second layer separates or strips the coalesced water droplets from the clean fuel that has passed through the first filter media 132 and the first layer of the second filter media 134. The separated water flows downwards under the influence of gravity toward a bottom end of the filter element 130, and the separated water may collect in a water reservoir of a filter housing within which the filter element 130 is disposed.

As shown in FIG. 1, a plurality of apertures 135 may be defined at a bottom end of the second filter media 134 (e.g., a lower end of the second filter media 134 with respect to gravity). The plurality of apertures 135 may be defined in one or both of the first layer and the second layer of the second filter media 134. Water separated from the fuel after passing through the second filter media 134 (e.g., coalesced by the first layer and/or stripped from the fuel flow by the second layer) flows downwards along the surface of the second filter media 134 and through the plurality of apertures 135 and therethrough falls into a water reservoir, from where the water can be drained.

A first endcap 142 is disposed on a top end of the first filter media 132, and a second endcap 144 is disposed on a bottom end of the first filter media 132 opposite the top end. The first endcap 142 defines an outlet for clean fluid to exit the filter element 130. In some embodiments, the first layer and the second layer of the coalescing tube forming the second filter media 134 are coupled to each other at their respective axial ends. A top end of the coalescing tube may be potted (i.e., bonded or fused) into the first endcap 142, and a bottom end of the coalescing tube may be potted into the second endcap 144. The axial edges of the coalescing tube forming the second filter media 134 may be covered in potting compound during manufacturing of the filter element 130 for sealing the first layer and the second layer.

A hydrophobic screen 136 is disposed across the outlet defined in the first endcap 142. Clean fuel after being filtered by the first filter media 132 and the second filter media 134 flows into the central channel 131 and then exits the filter element 130 through the outlet defined in the first endcap 142. There may still be small amount of water remaining in the fuel. The hydrophobic screen 136 serves as a final stage filter to strip any remaining water droplets from the fuel as the fuel passes through the hydrophobic screen 136 through the outlet. This further increases water separation efficiency of the filter element 130 and can allow the filter element 130 to have a water separation efficiency of up to 99%.

The hydrophobic screen 136 may be made from any suitable material. In some embodiments, the hydrophobic screen 136 may be formed from a polymer, for example, polyester or nylon. In other embodiments, the hydrophobic screen 136 may be formed from stainless steel coated with hydrophobic material. In some embodiments, the hydrophobic screen may have a pore size in a range of 10 microns to 150 microns. In particular embodiments, the pore size of the hydrophobic screen 136 may be in a range of about 55 microns to about 105 microns, inclusive.

The hydrophobic screen 136 may have an open area in a range of 15% to 60%, inclusive. In some embodiments, the hydrophobic screen 136 has a pore size of 105 microns and an open area of 33% or 52%. In other embodiments, the hydrophobic screen has a pore size of 55 microns and an open area of 31%. In still other embodiments, the hydrophobic screen 136 has a pore size of 18 microns and an open area of 18%. The pore size of the hydrophobic screen 136 may be specified such that it is not plugged by any particles that may pass through the first filter media 132 and the second filter media 134. In some embodiments, the hydrophobic screen 136 may be formed from woven threads. In other embodiments, the hydrophobic screen 136 may be formed from a perforated material, for example, a sheet of perforated, polymer, plastics, or metal (e.g., stainless steel).

Figure 2:
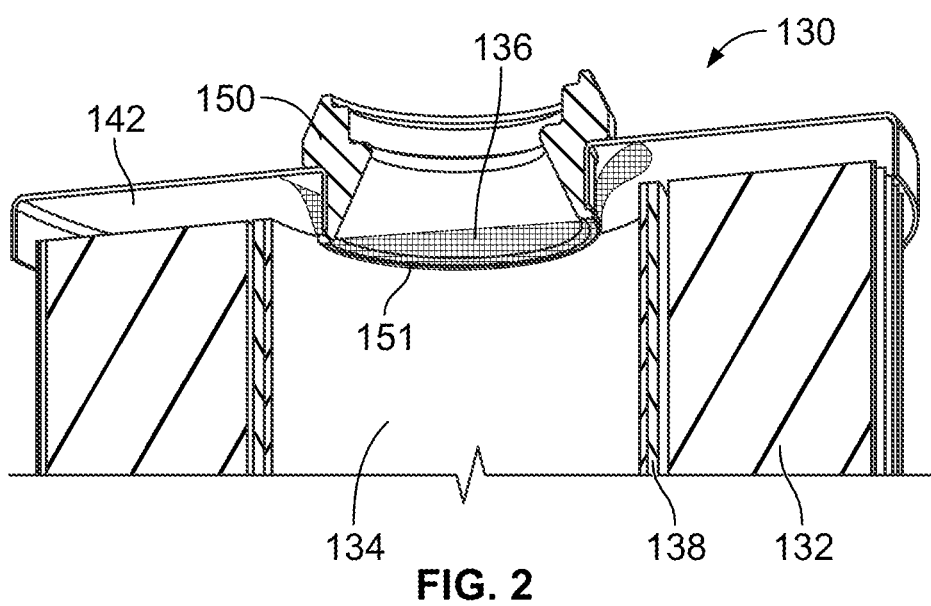
FIG. 2 is a side cross-sectional view of a portion of the filter element of FIG. 1 indicated by the arrow A in FIG. 1.
Figure 3A:
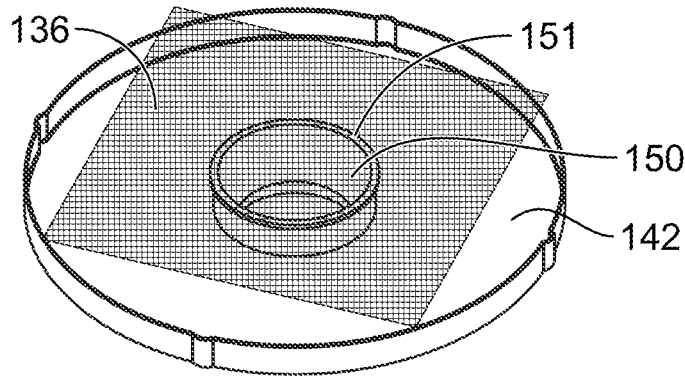
FIG. 3A is bottom perspective view of a first endcap included in the filter element of FIG. 1 having a hydrophobic screen disposed across an outlet of the first endcap.
Figure 3B:
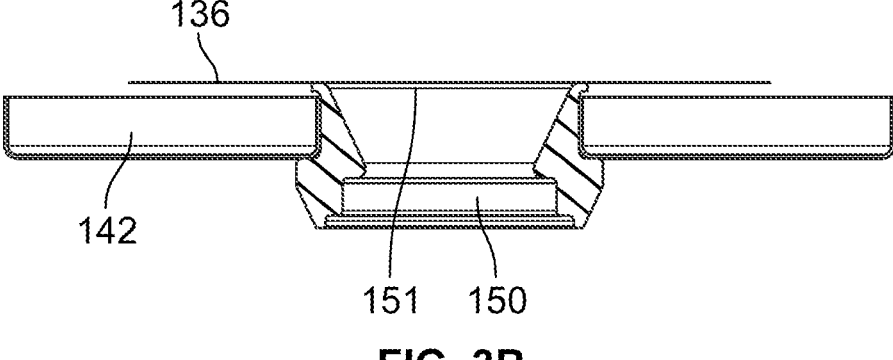
FIG. 3B is a side view of the endcap and hydrophobic screen of FIG. 3A.

Referring also now to FIGS. 2-3B, a sealing member 150 is disposed in the outlet defined through the first endcap 142. The sealing member 150 may include a gasket that is structured to receive an inlet of a filter head (e.g., the filter head 204 of FIG. 4) when the filter element 130 is coupled to the filter head. The sealing member 150 defines a channel therethrough. The hydrophobic screen 136 is disposed on an upstream end 151 of the sealing member 150. As shown in FIGS. 2-3B, to secure the hydrophobic screen 136 to the upstream end 151 of the sealing member 150, the hydrophobic screen 136 may be disposed on the first endcap 142 on a surface of the first endcap 142 that is structured to be proximate to the first filter media 132 such that a portion of the hydrophobic screen 136 overlaps the upstream end 151 of the sealing member 150. The first filter media 132 is then coupled to the surface of the first endcap 142 such that the hydrophobic screen 136 is interposed and thereby, secured between the first endcap 142 and the first filter media 132. A portion of the hydrophobic screen 136 remains disposed over the upstream end 151 to the sealing member 150 and serves as the final water stripping layer of the filter element 130.

Figure 4:
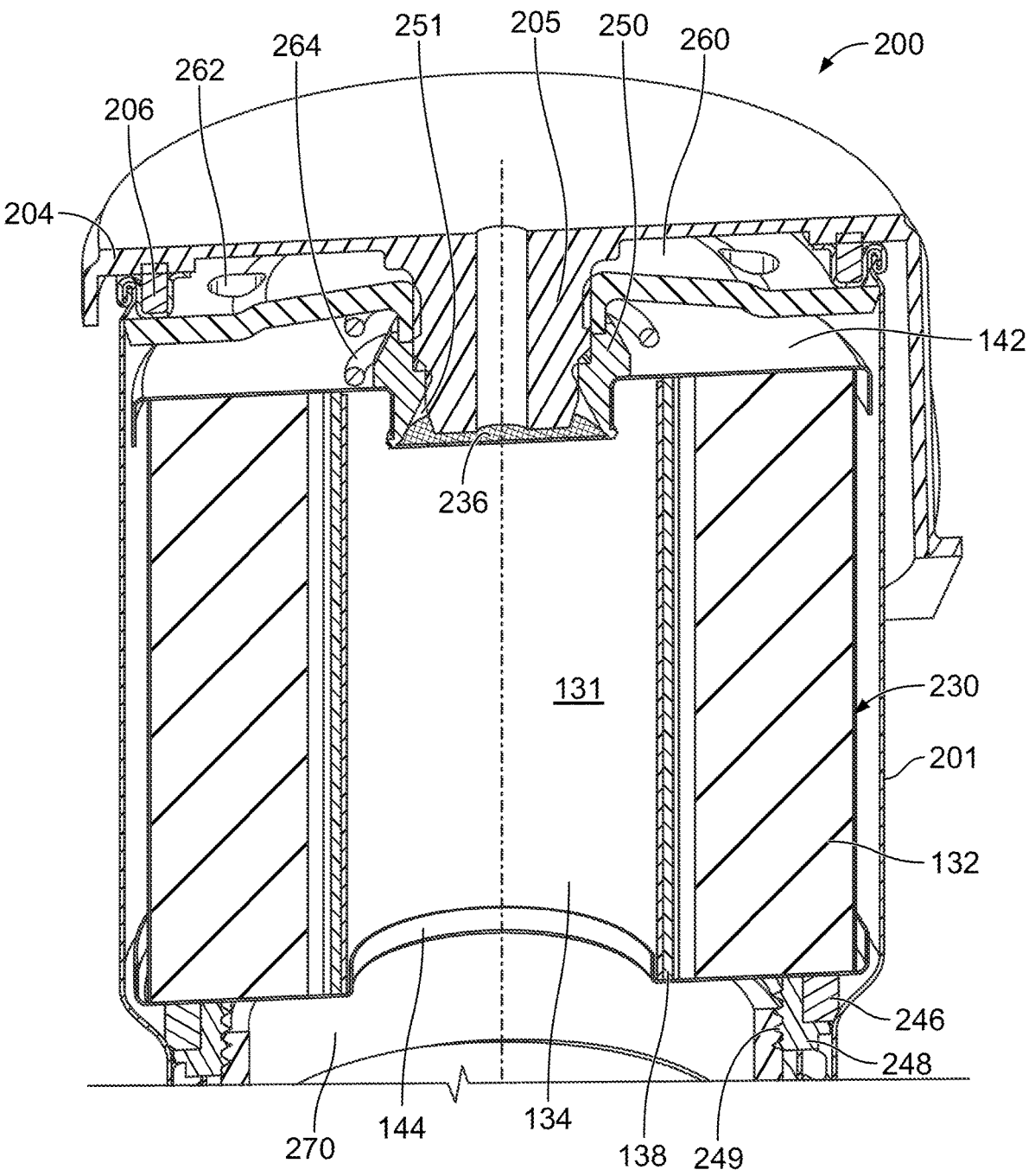
FIG. 4 is a cross-section view of a filter assembly, according to an embodiment.
Figure 5:
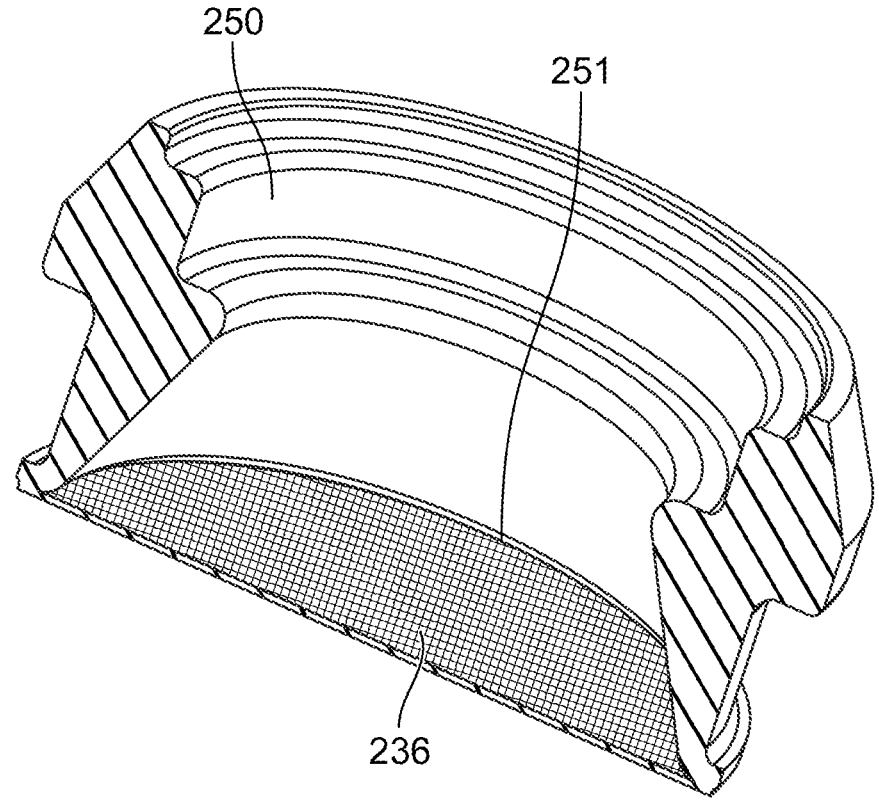
FIG. 5 is a cross-section view of a sealing member included in the filter assembly of FIG. 4, according to a particular embodiment.

In some embodiments, a hydrophobic screen may be coupled to an upstream end of the sealing member, for example, integrated with the sealing member. For example, FIG. 4 shows a side cross-section of a filter assembly 200, according to an embodiment. The filter assembly 200 includes a housing 201, a filter element 230, an adaptor 248, and an adaptor sealing member 246 positioned around the adaptor 248. It should be appreciated that while FIG. 4 and other figures show the hydrophobic screen coupled to an upstream end of a sealing member, in other embodiments the hydrophobic screen may be coupled to a downstream end of the sealing member. All such embodiments should be understood as being encompassed by this disclosure.

The housing 201 defines an internal volume within which the filter element 230 is disposed along a longitudinal axis $A_L$ of the housing 201. A nutplate 260 is coupled to a top end of the housing 201. The nutplate 260 defines a central opening which may serve as an outlet for filtered fuel to exit the housing 201. For example, a filter head inlet 205 of a filter head 204 may be inserted through central opening defined through the nutplate 260 when the filter assembly 200 is coupled to the filter head 204. Apertures 262 may also be defined in the nutplate 260 around the central opening for communicating unfiltered fuel into the housing 201 around the filter element 230. A filter head sealing member 206 (e.g., an O-ring or gasket) is disposed at the top end of the housing 201 and configured to form an axial and/or radial seal with the filter head 204 when the filter assembly 200 is coupled to the filter head 204.

The adaptor 248 is coupled to a bottom end of the housing 201 opposite the top end. The adaptor 248 may include a ring shaped structure including a plurality of threads 249 defined on a radially inner surface thereof. The plurality of threads 249 are configured to mate with corresponding threads of a water reservoir 270 to allow the water reservoir 270 to be coupled to the bottom end of the housing 201 via the adaptor 248. Water separated from the fuel after passing through the filter element 230 passes through the adaptor 248 into the water reservoir 270 and may be collected in the water reservoir 270 to be later drained.

The filter element 230 includes the first filter media 132, the second filter media 134, the center tube 138, the first endcap 142 and the second endcap 144, as previously described herein with respect to the filter element 130. However, different from the filter element 130, the filter element 230 includes a sealing member 250 disposed in the outlet defined in the first endcap 142. The sealing member 250 defines a channel through which the filter head inlet 205 is inserted when the filter element 230 is coupled to the filter head 204. Different from the sealing member 150, a hydrophobic screen 236 is coupled to an upstream end 251 of the sealing member 250, for example overmolded into the sealing member 250. In some embodiments, the hydrophobic screen 236 is integrally formed with the sealing member 250, for example, formed in a molding process used to form the sealing member 250. In other embodiments, the hydrophobic screen 236 may be bonded to the upstream end 251 via an adhesive, fusion bolding, welding, or any other suitable coupling process.

The adaptor sealing member 246 is disposed around the adaptor 248 and forms an axial seal with the second endcap 144. The adaptor sealing member 246 may include a gasket having a rectangular cross-section. In other embodiments, the adaptor sealing member 246 may include an O-ring. The adaptor sealing member 246 may be structured to form an axial and/or radial seal with the housing 201. For example, a top surface of the adaptor sealing member 246 that is proximate to the second endcap 144, abuts the second endcap 144 to from an axial seal therewith, and may also form a radial seal with the housing 201. In this manner, the adaptor sealing member 246 forms a seal between the housing 201 and the filter element 230 without being disposed in or being held by either the housing 201 or the filter element 230. Alignment and positioning of the adaptor sealing member 246 is achieved instead by the adaptor 248. Moreover, the adaptor sealing member 246 can have a simple design that facilitates manufacturability and reduces manufacturing and installation costs.

As shown in FIG. 4, the sealing member 250 is disposed between the first endcap 142 and the nutplate 260 and provides a seal between the central channel 131 of the filter element 130 and the central opening of the nutplate 260. For example, a first portion of the sealing member 250 may be disposed within an inner rim of the outlet defined in the first endcap 142 that is co-axial with the central channel 131 of the first filter media 132. A second portion of the sealing member 250 surrounds the central opening of the nutplate 260 such that the sealing member 250 forms a conduit coupling the central channel 131 with the central opening as well as forms a seal therebetween.

A biasing member 264 (e.g., a helical spring, a Belleville spring, a coiled spring, etc.) is operatively coupled to the second endcap 144. For example, the biasing member 264 may be disposed between the nutplate 260 and the first endcap 142. The biasing member 264 applies a biasing force on the first endcap 142 urging the filter element 230 towards the adaptor sealing member 246 so as to cause the first endcap 142 to push against the adaptor sealing member 246. Moreover, the biasing force also pushes the adaptor sealing member 246 towards the housing 201, which enhances the seal between the housing 201 and the second endcap 144 via the adaptor sealing member 246.

As previously described, apertures 135 or perforations may be present proximate to a bottom end of a filter media tube that forms the second filter media 134 to drain coalesced water. The size of the apertures 135 may be so small that it is difficult to discern which end of the filter media tube is the bottom end when inserting the filter media tube into a center tube (e.g., the center tube 138). This may lead to incorrect orientation with the apertures 135 being located at a top end instead of the bottom end. To address this alignment issue, the filter media tube may be tapered in some embodiments. For example, FIG. 6 is a side view of a filter media tube 334 that is tapered, according to an embodiment. As shown in FIG. 6, a bottom end 337 of the filter media tube 334 proximate to which a plurality of apertures 335 are defined, has a larger cross-sectional width (e.g., diameter) relative a top end 339 of the filter media tube 334 opposite the bottom end 337. The plurality of apertures 335 may be located on an inner diameter of the filter media tube 334 proximate to the larger bottom end 337. Thus, based on the difference in cross-sections of the top end 339 and the bottom end 337, a user may differentiate between the top end 339 and the bottom end 337. In other embodiments, the top end 339 may have a larger cross-sectional width than the bottom end 337 of the filter media tube 334, and the plurality of apertures 335 are defined at the smaller bottom end 337.

The top end 339 being smaller than the bottom end 337, or vice versa, allows the tapered filter media tube 334 to be inserted into a non-uniform or tapered cross-section center tube only in one direction, that is the smaller cross-section top end 339 inserted first into the center tube.

FIG. 7A illustrates a rectangular filter media sheet and FIG. 7B shows the rectangular filter media sheet being folded into a uniform cross-section filter media tube, according to an embodiment. Similarly, FIG. 8A illustrates a rectangular filter media sheet and FIG. 8B shows the rectangular filter media sheet being folded into a tapered filter media tube, according to an embodiment. FIG. 8C is a side perspective view of the filter media tube of FIG. 7B. A slight overlap is present when the rectangular filter media sheet is folded to form a tapered filter media tube. However, the maximum overlap width may be relatively small (e.g., less than 20 mm), which has negligible impact on the overall filtration efficiency or porosity of the filter media tube.

Figure 9:
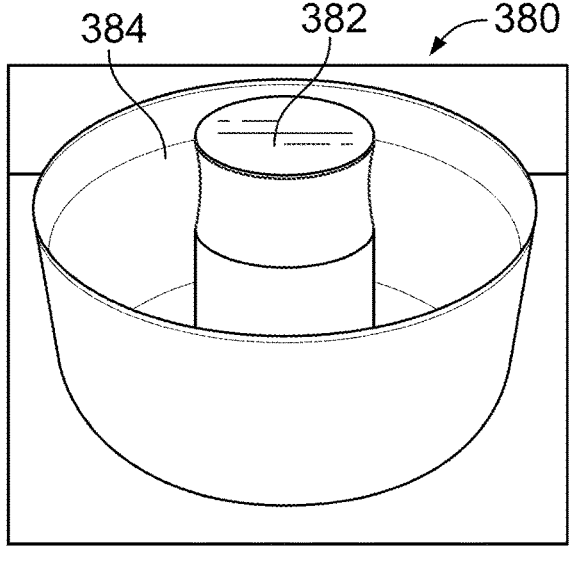
FIG. 9 is a perspective view of an assembly tool for facilitating insertion of a tapered filter media tube into a center tube disposed within filter media, according to an embodiment.

FIG. 9 is a perspective view of an assembly tool 380 for facilitating insertion of a tapered filter media tube 334 into a center tube of a filter element, according to an embodiment. The center tube may have a uniform cross-section, may have an hour glass shape, and or have any other shape or cross-section that allows the tapered filter media tube 334 to be inserted therein from any axial direction (e.g., a tapered shape with a sufficiently large diameter to allow insertion of the tapered filter media tube 334 therein in any orientation). The assembly tool 380 includes an assembly cylinder 382 having first portion having a first cross-sectional width (e.g., diameter), and a second portion coupled to the first portion. The second portion has a smaller cross-section (e.g., diameter) than the first portion such that the assembly cylinder 382 tapers from the first portion to the second portion. The first portion may disposed in an assembly cap 384.

The assembly cylinder 382 prevents the tapered filter media tube from being inserted upside down into the center tube because, while an end of the filter media tube that has a smaller cross-section may be inserted over the second portion of the assembly cylinder 382, it will interfere with the larger cross-sectional width first portion of the assembly cylinder 382, preventing further insertion of the tapered filter media tube towards the assembly cap 384.

Figure 10D:
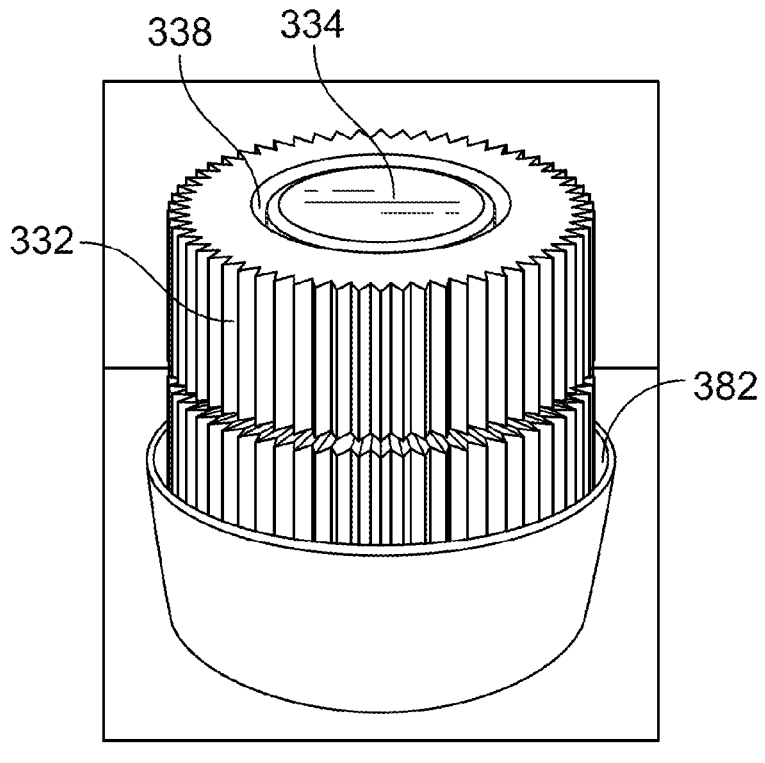
FIG. 10D is a perspective view of a filter media disposed in the assembly tool and having a center tube and tapered filter media tube inserted therein in the correct orientation facilitated by the assembly tool.

FIGS. 10A-10C are various images of the tapered filter media tube 334 of FIG. 6 being inserted into a center tube 338 (e.g., a uniform cross-section or hour glass shaped center tube) using the assembly tool 380, according to an embodiment. As shown in FIGS. 10A-10B, if the filter media tube 334 is inserted into the center tube 338 in the incorrect orientation (e.g., smaller cross-section top end 339 being inserted first), there is interference with the assembly cylinder 382 (FIG. 10A showing interference at maximum diameter and FIG. 10B showing interference at the minimum diameter of top end 339 of the filter media tube 334 having the smaller cross-section) preventing the filter media tube 334 from being inserted completely into the center tube 338. In contrast, FIG. 10C shows the filter media tube 334 being inserted in the correct orientation into the center tube 338 where the filter media tube 334 does not interfere with the assembly cylinder 382 and slides over both the second and first portions of the assembly cylinder 382 so as to fit completely within the center tube 338. In some embodiments, visual marking may be provided on the filter media tube 334 to allow the user to differentiate between the bottom end 337 and the top end 339 of the tapered filter media tube 334. In some embodiments, a tapered center tube including a close-fitting tapered filter media tube 334 may also be used with the assembly tool 380 to ensure that the tapered center tube and tapered filter media tube 334 assembly is oriented correct when forming the filter element. In such embodiments, both the tapered center tube and the tapered filter media tube 334 would be pushed up relative to the filter media 332, i.e., ejected out of the filter media, if their orientation is incorrect.

Figure 11:
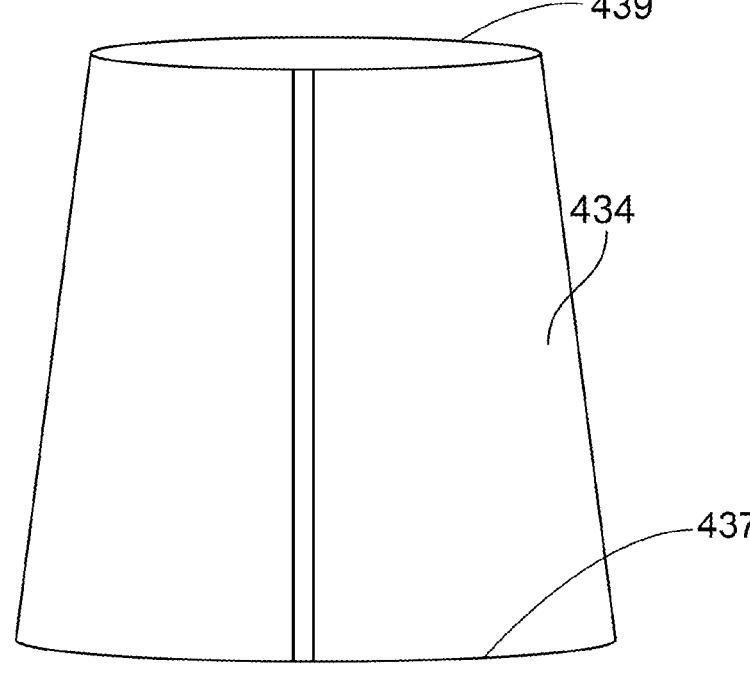
FIG. 11 is a side view of a tapered filter media tube, according to an embodiment.
Figure 12:
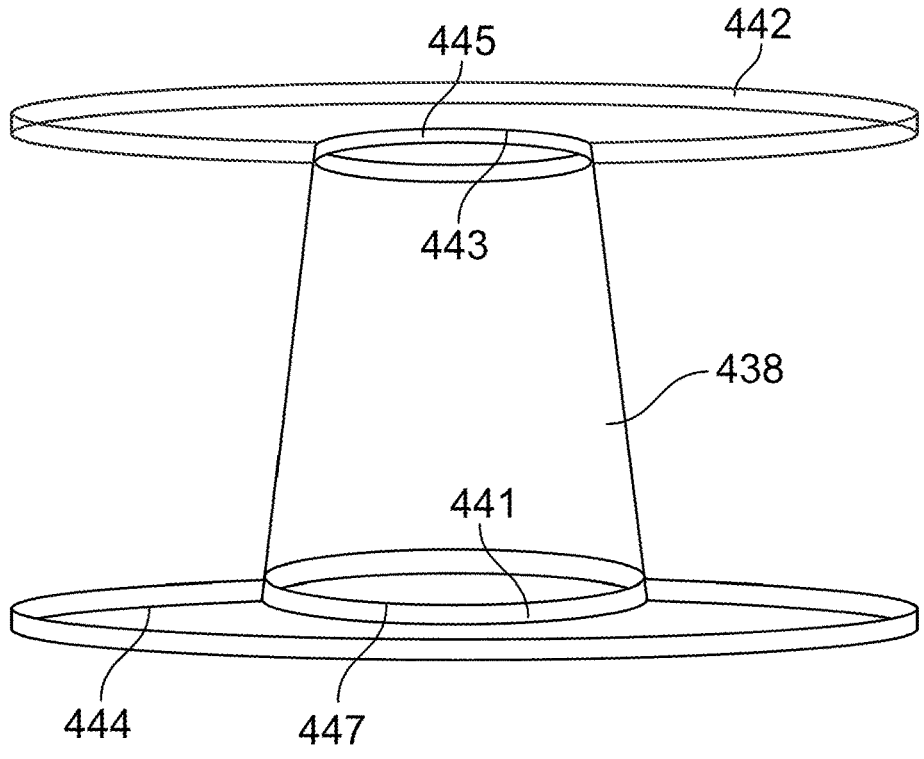
FIG. 12 is a side perspective view of a center tube that is tapered on the inner diameter and straight walled on the outer diameter with endcaps coupled thereto, according to an embodiment.

In some embodiments, a center tube may also have a tapered profile. For example, FIG. 11 is a side view of a tapered filter media tube 434 and FIG. 12 is a side perspective view of a tapered center tube 438 structured to receive the tapered filter media tube in only one direction, according to an embodiment. A bottom end 441 of the center tube 438 has a larger cross-section than a top end 443 of the center tube 438, the bottom end 441 of the center tube 438 corresponding to the bottom end 437 of the filter media tube 434, and the top end 443 of the center tube 438 corresponding to the top end 439 of the filter media tube 434. The center tube 438 thereby, becomes a go/no-go gauge allowing insertion of the filter media tube 434 only in the correct orientation. A visual marking may be present on the filter media tube 434 to aid orientation, as previously described.

FIG. 12 also shows a top endcap 442 coupled to the top end 443 of the center tube 438, and a bottom endcap 444 coupled to the bottom end 441 of the center tube 438, according to an embodiment. The bottom endcap 444 has a larger diameter bottom endcap inner rim 447, which is coupled to an inner surface of the bottom end 441 of the center tube 438, compared to a diameter of a top endcap inner rim 445 of the top endcap 442, which is coupled to an inner surface of the top end 443 of the center tube 438.

Figure 13:
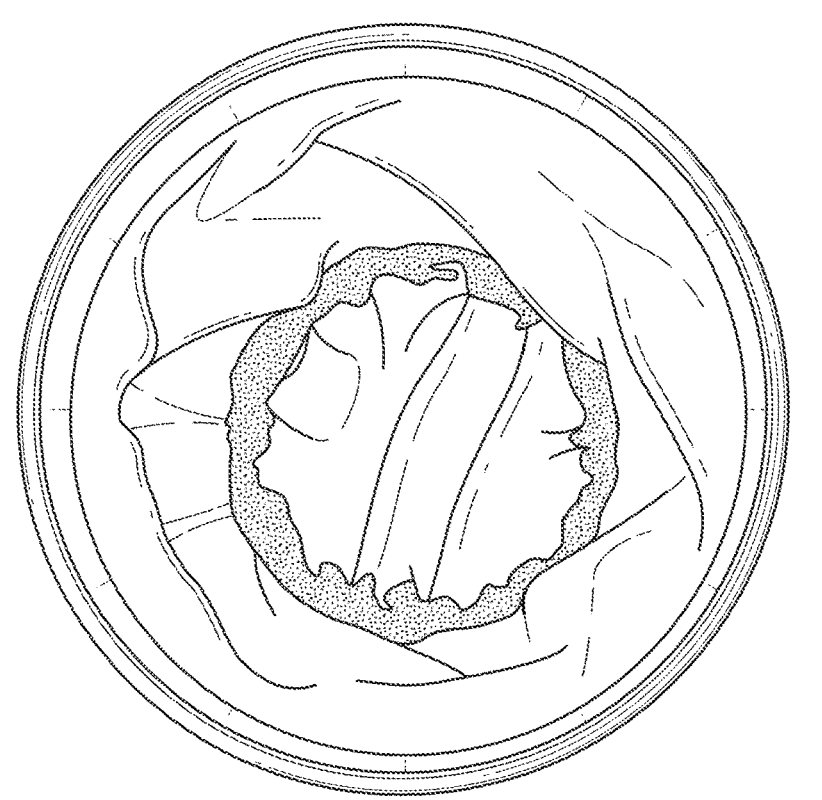
FIG. 13 shows an inner view of a filter media tube having pillowing after insertion into a center tube.
Figure 14:
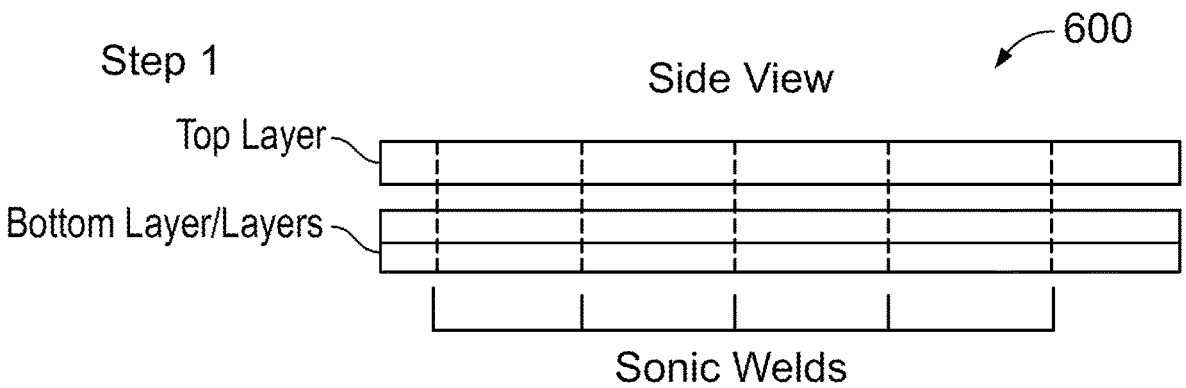
FIG. 14-15 illustrates various steps in a method of forming a tapered filter media tube to increase uniformity of pillowing of the tapered filter media tube, according to an embodiment.
Figure 14:
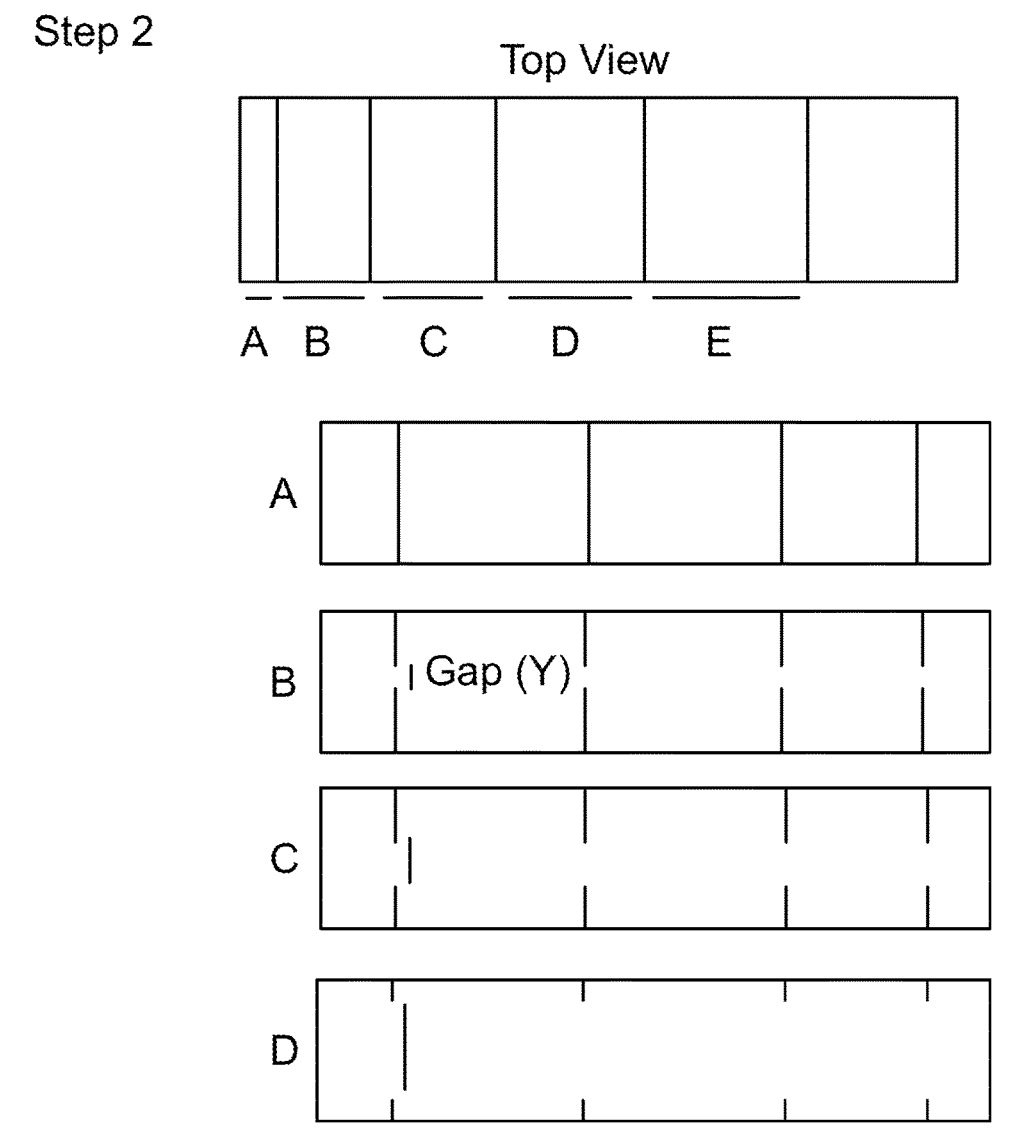
Figure 15:
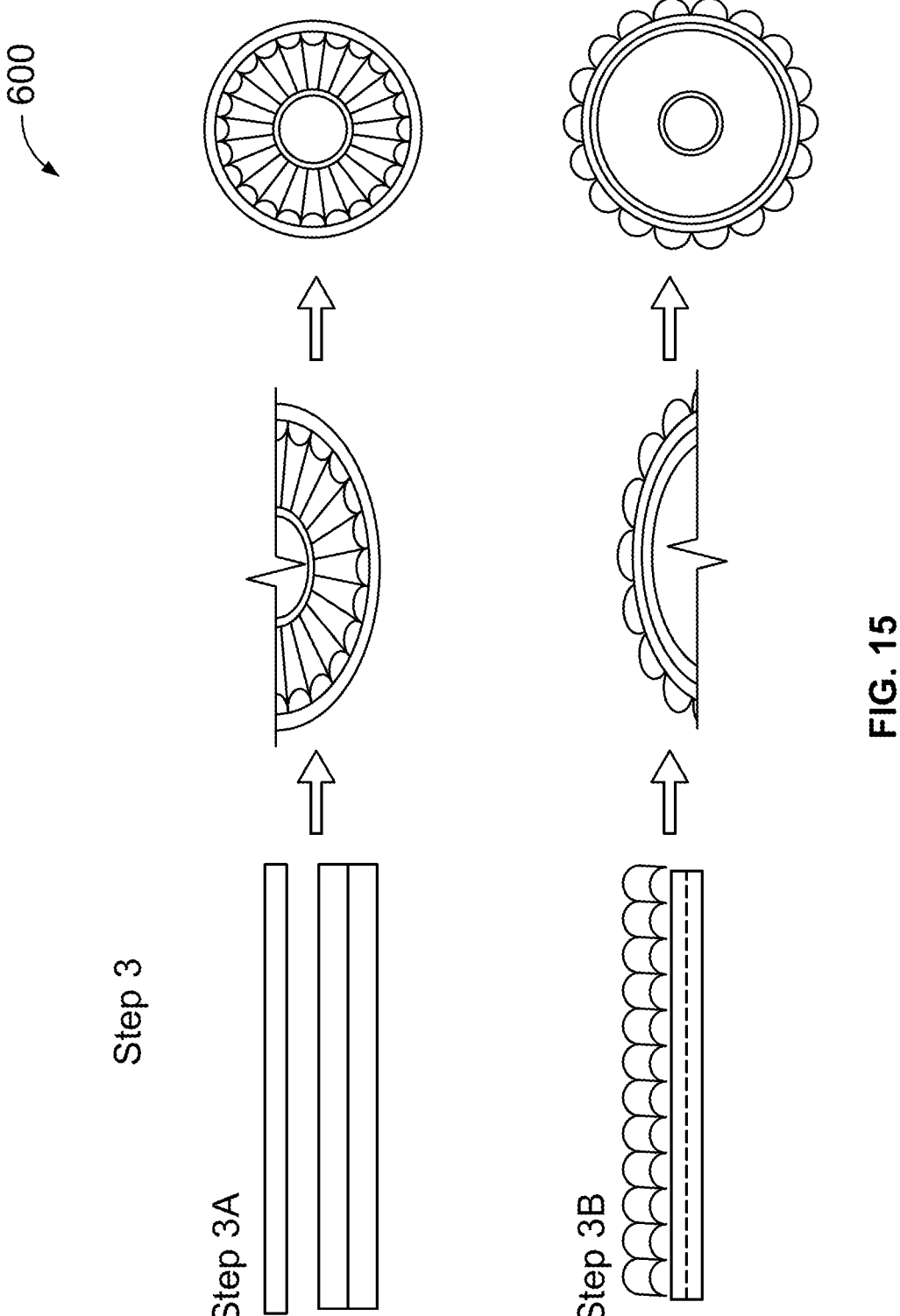

In some embodiments, pillowing may occur in a filter media tube during insertion into a center tube. For example, FIG. 13 shows an inner view of a filter media tube having pillowing after insertion into a center tube. It may be desirable to obtain uniform pillowing around the inner circumference. FIG. 14-15 illustrates various processes in a method 600 of forming a filter media tube to increase uniformity of pillowing of the filter media tube, according to an embodiment.

The method 600 includes layering the media, at step 1, for example, layering a top media layer over a bottom media layer/s. At step 2, vertical points along the length of the media layers are coupled, for example, (via ultrasonic welding, adhesives, bonding, etc.). The distance between coupled areas may vary based on the total length of the layers. The coupled areas do not have to be the full height of the filter media tube. The dimension Y may change with the total height of the filter media tube or as needed.

At step 3, the coupled media layers are rolled into a filter media tube. Two options may be used. For example, one option is shown in step 3A, in which the top layer is flat when coupling happens. This allows the pillowing to happen on the internal diameter of the filter media tube naturally due to the circumference difference of the outer layer vs. the inner layer. Another option is shown in step 3B, in which the top layer is coupled with defined space between the coupled areas to cause pillowing, and the coupled layers are rolled into a filter media tube such that pillowing is on an outer diameter of filter media tube.

Figure 16:
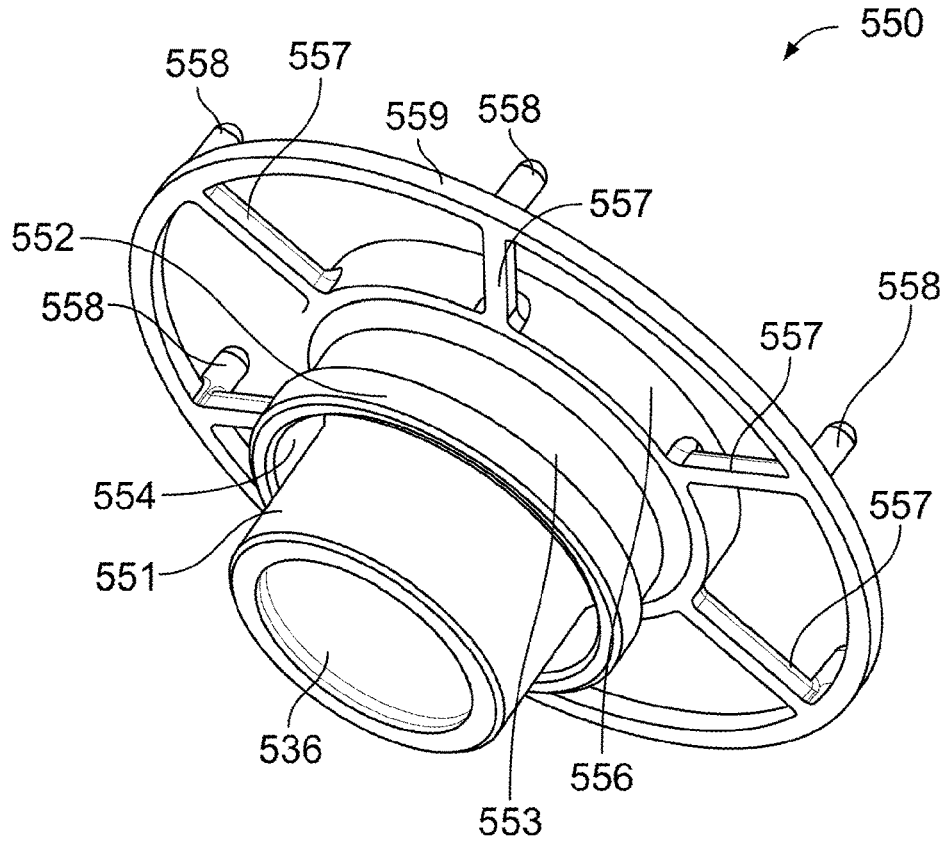
FIG. 16 is a perspective view of a sealing member for use in a filter assembly, according to another embodiment.
Figure 17:
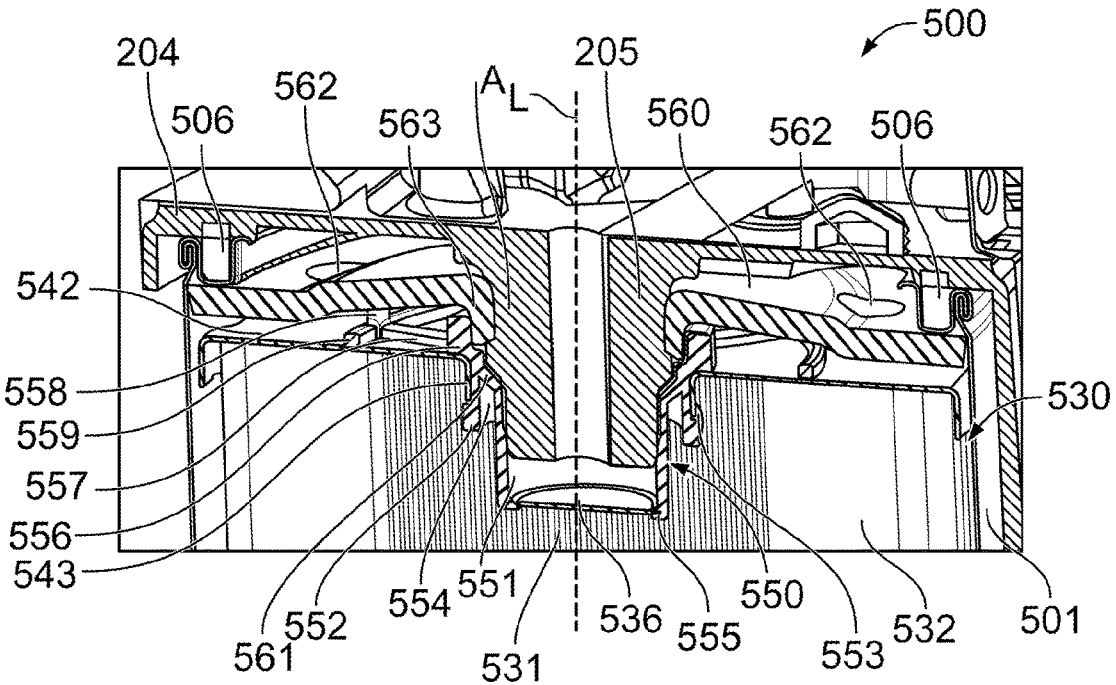
FIG. 17 is a side cross-sectional view of a portion of a filter assembly including the sealing member of FIG. 16.

FIG. 16 is a perspective view of a sealing member 550 that may be used in a filter assembly (e.g., the filter assembly 100), according to still another embodiment. FIG. 17 is a side cross-sectional view of a portion of a filter assembly 500 including the sealing member 550, the filter assembly 500 being coupled to the filter head 204. The sealing member 550 comprises a sealing member main body 551 defining a longitudinal channel structured to receive the inlet 205 of the filter head 204. A hydrophobic screen 536 is coupled to an upstream end of the sealing member main body 551. The hydrophobic screen 536 may substantially similar to the hydrophobic screen 136 or 236 previously described herein. In some embodiments, a circumferential slot 555 may be defined on an inner surface of the sealing member main body 551 and an outer peripheral edge of the hydrophobic screen 536 may be inserted into the circumferential slot 555 to secure the hydrophobic screen 536 to the upstream end of the sealing member main body 551. In other embodiments, the hydrophobic screen 536 may be embedded in the upstream end of the sealing member main body 551 (e.g., over-molded into the upstream end of the sealing member main body 551).

The sealing member main body 551 includes a sealing member downstream portion 556 that has a larger cross-sectional width (e.g., diameter) than the upstream end of the sealing member main body 551. A plurality of arms 557 extend radially outwards from an outer surface of the sealing member downstream portion 556. The sealing member ring 559 is disposed circumferentially around the sealing member downstream portion 556 and is coupled to axial ends of each of the plurality of arms 557 that are distal from the sealing member downstream portion 556. A plurality of spacer pins 558 extends from the sealing member ring 559 in a direction that is axially away from upstream end of the sealing member main body 551. The spacer pins are disposed at locations of the sealing member ring 559 where the plurality of arms 557 are coupled to the sealing member ring 559.

The sealing member 550 also comprises an endcap sealing portion 552 structured to form a seal with an endcap of a filter element (e.g., the filter element 530 as described with respect to FIG. 17). The endcap sealing portion 552 includes a circumferential wall extending axially towards the upstream end of the sealing member 550 from a sealing member intermediate portion 561 that couples the sealing member main body 551 to the sealing member downstream portion 556 such that a space 554 is formed between the sealing member main body 551 and the endcap sealing portion 552. A length of the endcap sealing portion 552 is less than a length of the sealing member main body 551 such that the endcap sealing portion 552 only extends part way towards the upstream end.

FIG. 17 shows a side cross-section of a filter assembly 500, according to an embodiment. The filter assembly 500 includes a housing 501, a filter element 530 including the sealing member 550, and a nutplate 560. The housing 501 may be substantially similar to the housing 201, and defines an internal volume within which the filter element 530 is disposed along a longitudinal axis $A_L$ of the housing 501.

The housing 501 defines an internal volume within which the filter element 530 is disposed along a longitudinal axis $A_L$ of the housing 501. The filter element 530 includes a filter media 532 defining a central channel 531 extending in an axial direction about the longitudinal axis $A_L$. The filter media 532 is a radial flow filter media and may be substantially similar to the filter media 132 previously described herein. A first endcap 542 is disposed on a first end (e.g., a top end) of the filter media 532. The first endcap 542 defines an endcap outlet for clean fluid to exit the filter element 530. A first endcap flange 543 extends downwards from an inner peripheral edge of endcap outlet of the first endcap 542 into the central channel 531 of the filter media 532.

A nutplate 560 is coupled to a first end (e.g., top end) of the housing 501 that is located proximate to the first end of the filter media 532. The nutplate 560 defines a central opening that may serve as an outlet for filtered fluid (e.g., filtered fuel) to the exit the housing 501. For example, the filter element 530 may be coupled to the filter head 204 and a filter head inlet 205 of the filter head 204 may be inserted through the central opening defined through the nutplate 560 when the filter assembly 500 is coupled to the filter head 204. Apertures 562 may also be defined through the nutplate 560 around the central opening for communicating unfiltered fuel into the housing 501 around the filter element 530. A filter head sealing member 506 (e.g., an O-ring or gasket) is disposed at the first end of the housing 501 and configured to form an axial and/or radial seal with the filter head 204 when the filter assembly 500 is coupled to the filter head 204.

The sealing member 550 is disposed at the first end of the filter element 530 and configured to form a seal with the filter head inlet 205, the first endcap 542, and may also form a seal with the nutplate 560. Expanding further, the sealing member 550 is disposed through the outlet defined through the first endcap 542 such that a radially inner surface of the first endcap flange 543 is disposed around and contacts a radially outer surface of the endcap sealing portion 552 of the sealing member 550 such that a radial seal is formed therebetween. An endcap sealing portion ledge 553 extends radially outwards from the endcap sealing portion 552, at least a portion of the first endcap flange being disposed radially inward of an outer radial edge of the endcap sealing portion ledge 553. In some embodiments, an axial distance from the sealing member downstream portion 556 to an axial surface of the endcap sealing portion ledge 553 that is distal from the hydrophobic screen 536 corresponds to a length of the first endcap flange 543 such that an axial end of the first endcap flange 543 is disposed on and contacts the axial surface of the endcap sealing portion ledge 553. In some embodiments, an axial surface of the sealing member downstream portion 556 that is proximate to the first endcap 542 may also contact and form an axial and/or radial seal with a first axial surface of the first endcap 542 that is distal from the filter media 532 and/or the radially inner surface of the first endcap flange 543.

The plurality of arms 557 and the sealing member ring 559 are disposed on the first axial surface of the first endcap 542. The spacer pins 558 may contact an axial surface of the nutplate 560 that is proximate to the first axial surface of the first endcap 542 so as to maintain a spacing between the nutplate 560 and the first endcap 542. A nutplate flange 563 extends axially towards the sealing member 550 from an inner periphery of the central opening of the nutplate 560. The nutplate flange 563 extends into the sealing member downstream portion 556 such that a radially outer surface of the nutplate flange 563 contacts a radially inner surface of the sealing member downstream portion 556 such that a radial seal is formed therebetween.

The filter head inlet 205 extends into the sealing member main body 551 such that a radially outer surface of the filter head 204 contacts at least a portion of a radially inner surface of the sealing member main body 551 (e.g., because of an interference fit therebetween) such that a radial seal is formed between the sealing member main body 551 and the filter head inlet 205. A portion of the filter head inlet 205 may also may contact the sealing member intermediate portion 561 and form an axial and/or radial seal therewith. For example, an inner surface of the sealing member intermediate portion 561 may be shaped to conform to a shape of at least a portion of the filter head inlet 205 so as to form the axial and/or radial seal therewith.

As used herein, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present application.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter element, comprising:
a first filter media defining a central channel;
an endcap disposed on an end of the first filter media, the endcap defining an outlet for clean fluid to exit the filter element, and the endcap comprising an endcap flange;
a sealing member disposed within the outlet such that a radially inner surface of the endcap flange contacts a radially outer surface of the sealing member to form a radial seal therebetween;
a second filter media disposed radially inward of the first filter media, the second filter media structured to coalesce water; and
a hydrophobic screen disposed on the sealing member across the outlet defined in the endcap.

2. The filter element of claim 1, wherein;
the sealing member defines a channel therethrough,
wherein the hydrophobic screen is disposed on an upstream end of the sealing member.

3. The filter element of claim 2, wherein the hydrophobic screen is coupled to the upstream end of the sealing member.

4. The filter element of claim 2, wherein the sealing member comprises a circumferential slot defined on a radially inner surface of the sealing member, an outer peripheral edge of the hydrophobic screen positioned within the circumferential slot.

5. The filter element of claim 2, wherein the sealing member comprises:
a sealing member main body disposed within the central channel of the first filter media and defining the upstream end of the sealing member;
a sealing member downstream portion located downstream of the sealing member main body, the sealing member downstream portion having a larger cross-sectional width than the upstream end;
a sealing member intermediate portion coupling the sealing member main body to the sealing member downstream portion; and
an endcap sealing portion comprising a circumferential wall extending axially towards the upstream end of the sealing member from the sealing member intermediate portion such that a radial space is formed between the sealing member main body and the endcap sealing portion.

6. The filter element of claim 5, wherein:
the endcap defines an endcap outlet, the endcap flange extends axially from an inner peripheral edge of the endcap outlet into the central channel of the filter media, and radially inner surface of the endcap flange is disposed around the radially outer surface of the endcap sealing portion.

7. The filter element of claim 6, wherein:
the endcap sealing portion comprises an endcap sealing portion ledge extending radially outwards from the endcap sealing portion, and
a first axial end of the endcap flange is disposed on and contacts an axial surface of the endcap sealing portion ledge which is distal from the upstream end.

8. The filter element of claim 6, wherein an axial surface of the sealing member downstream portion, which is proximate to the first endcap, contacts and forms at least one of an axial seal with an axial surface of the endcap that is proximate to the sealing member downstream portion, or a radial seal with the radially inner surface of the endcap flange.

9. The filter element of claim 5, wherein the sealing member further comprises a plurality of arms extending radially outwards from an outer surface of the sealing member downstream portion.

10. The filter element of claim 9, wherein the sealing member further comprises a sealing member ring disposed circumferentially around the sealing member downstream portion and coupled to axial ends of each of the plurality of arms that are distal from the sealing member downstream portion.

11. The filter element of claim 10, wherein the sealing member further comprises a plurality of spacer pins extending from the sealing member ring in a direction that is axially away from the upstream end of the sealing member.

12. The filter element of claim 11, wherein the spacer pins are disposed at locations of the sealing member ring where the plurality of arms are coupled to the sealing member ring.

13. The filter element of claim 1, wherein the second filter media comprises:
a first layer structured to coalesce water; and
a second layer downstream of the first layer, the second layer being a hydrophobic layer.

14. The filter element of claim 1, wherein the second filter media comprises a filter media tube having a tapered profile along a longitudinal axis of the filter element.

15. A filter assembly, comprising:
a housing defining an internal volume;
the filter element of claim 5, disposed within the internal volume; and
a nutplate coupled to a first end of the housing that is proximate to the end of the filter media on which the endcap is disposed, the nutplate defining a central opening and a nutplate flange extending axially towards the sealing member from an inner periphery of the central opening of the nutplate,
wherein the nutplate flange extends into the sealing member downstream portion such that a radially outer surface of the nutplate flange contacts a radially inner surface of the sealing member downstream portion to form a radial seal therebetween.

16. A sealing member for forming a seal between a filter element and a filter head, comprising:
a sealing member main body configured to be disposed within a central channel of a filter media of the filter element, the sealing member main body defining an upstream end of the sealing member;
a sealing member downstream portion located downstream of the sealing member main body, the sealing member downstream portion having a larger cross-sectional width than the upstream end, wherein the sealing member further comprises a plurality of arms extending radially outwards from an outer surface of the sealing member downstream portion;
a sealing member intermediate portion coupling the sealing member main body to the sealing member downstream portion; and
an endcap sealing portion comprising a circumferential wall extending axially towards the upstream end of the sealing member from the sealing member intermediate portion such that a radial space is formed between the sealing member main body and the endcap sealing portion.

17. The sealing member of claim 16, wherein the sealing member further comprises a sealing member ring disposed circumferentially around the sealing member downstream portion and coupled to axial ends of each of the plurality of arms that are distal from the sealing member downstream portion.

18. The sealing member of claim 17, wherein the sealing member further comprises a plurality of spacer pins extending from the sealing member ring in a direction that is axially away from the upstream end of the sealing member.

19. The sealing member of claim 18, wherein the spacer pins are disposed at locations of the sealing member ring where the plurality of arms are coupled to the sealing member ring.

20. A filter element comprising:
a filter element comprising a filter media having a central channel;
a sealing member comprising:
a sealing member main body disposed within the central channel of the filter media of the filter element, the sealing member main body defining an upstream end of the sealing member;
a sealing member downstream portion located downstream of the sealing member main body, the sealing member downstream portion having a larger cross-sectional width than the upstream end;

a sealing member intermediate portion coupling the sealing member main body to the sealing member downstream portion; and an endcap sealing portion comprising a circumferential wall extending axially towards the upstream end of the sealing member from the sealing member intermediate portion such that a radial space is formed between the sealing member main body and the endcap sealing portion and an endcap comprising an endcap outlet and an endcap flange extending axially from an inner peripheral edge of the endcap outlet into the central channel of the filter media; and wherein the endcap sealing portion is disposed with the central channel of the filter media such that a radially inner surface of the endcap flange is disposed around and contacts a radially outer surface of the endcap sealing portion to form a radial seal therebetween when the sealing member is coupled to the endcap.

21. The filter element of claim 20, wherein:

the endcap sealing portion comprises an endcap sealing portion ledge extending radially outwards from the endcap sealing portion, and a first axial end of the endcap flange is configured to be disposed on, and contact an axial surface of the endcap sealing portion ledge which is distal from the upstream end when the sealing member is coupled to the endcap.

22. A filter element, comprising:

a first filter media defining a central channel;

a filter media tube disposed within the central channel, the filter media tube having a tapered profile along a longitudinal axis of the filter element; and first and second end caps disposed on first and second ends of the first filter media, wherein the filter media tube extends between and is connected to the first and second end caps, the first endcap defining an outlet for clean fluid to exit the filter element.

\* \* \* \* \*